United States Patent
Clark et al.

(10) Patent No.: US 6,774,165 B1
(45) Date of Patent: Aug. 10, 2004

(54) AMINE-FREE EMULSIFICATION OF ALKALINE EARTH METAL SULFONATES

(75) Inventors: Steven D. Clark, Woodbury, NJ (US); Paul Morrison, New London, PA (US); Pedro Velis, Allison Park, PA (US)

(73) Assignee: Stoney Creek Technologies, LLC, Trainer, PA (US)

( * ) Notice: Subject to any disclaimer, the term of this patent is extended or adjusted under 35 U.S.C. 154(b) by 0 days.

(21) Appl. No.: 09/621,857

(22) Filed: Jul. 24, 2000

(51) Int. Cl.$^7$ ................................................. C08K 5/42
(52) U.S. Cl. ................ 524/166; 106/14.05; 106/14.11; 106/14.13; 106/14.14; 106/14.15; 106/14.21
(58) Field of Search ....................... 524/166; 106/14.05, 106/14.11, 14.13, 14.14, 14.15, 14.21

(56) References Cited

U.S. PATENT DOCUMENTS

| | | | | | |
|---|---|---|---|---|---|
| 3,730,895 A | * | 5/1973 | Kjonaas | ...................... | 508/176 |
| 3,846,355 A | * | 11/1974 | Mayer | ................... | 260/18 TN |
| 3,925,087 A | * | 12/1975 | Lechner et al. | .......... | 106/14.25 |
| 4,479,981 A | * | 10/1984 | Winters et al. | ............... | 427/27 |
| 4,622,360 A | * | 11/1986 | Gomi et al. | ................. | 524/507 |
| 4,631,083 A | * | 12/1986 | Christhilf et al. | ............ | 524/166 |
| 4,749,412 A | * | 6/1988 | Ciuba et al. | ............. | 106/14.23 |
| 5,851,961 A | * | 12/1998 | Magyar | ....................... | 507/119 |
| 5,868,819 A | * | 2/1999 | Guhde et al. | ............. | 106/14.14 |

* cited by examiner

*Primary Examiner*—Judy M. Reddick
(74) *Attorney, Agent, or Firm*—Massinger Law Offices

(57) ABSTRACT

A method of preparing an amine-free emulsion of alkaline earth metal sulfonates is disclosed. A solution of water and a nonionic, associative thickener of the type normally used for viscosity and thixotropy modification of latex compounds is combined with an overbased or neutral earth metal sulfonate or sulfonate complex to produce the emulsion. Mixtures of these emulsified products with other ingredients such as neutral diluent oils, linear alcohol/hydrocarbon mixtures, tall oil fatty acids, non-ionic surfactants, oxidized polyethylene waxes, small levels of microcrystalline wax, petrolatums, and/or calcium salts of oxidized petrolatums is also disclosed. The resulting emulsions find application in the modification of asphalt emulsions, the formulation of temporary coatings for the protection of painted automotive surfaces (transit coatings for automobiles) and in the prevention of corrosion of metal surfaces.

20 Claims, No Drawings

AMINE-FREE EMULSIFICATION OF ALKALINE EARTH METAL SULFONATES

FIELD OF THE INVENTION

The subject invention is directed to the preparation of alkaline earth metal sulfonate emulsions in general, and to the amine-free preparation of the same in particular.

BACKGROUND OF THE INVENTION

The reduction or elimination of solvent emissions for environmental reasons has generated great interest in the handling of sulfonates in a water medium. Of particular interest are structurally modified overbased calcium sulfonates (SACI®, Stoney Creek Technologies, LLC, hereinafter "Stoney Creek") which are frequently used as rust preventatives. More specifically, such sulfonates serve as, inter alia, coatings for the protection of metal surfaces, and as bases for the formulation of temporary coatings for the protection of painted automotive surfaces during transportation (transit coatings for automobiles). Such uses, however, first require emulsified sulfonate products with application-specific properties.

For instance, the transit coating market requires a coating which is low in volatile organic compounds ("VOC's"), water borne or solvent free, capable of drying quickly, water resistant when dry, easily removed when desired, and one which provides protection of the painted surface from the effects of acid rain, air borne contaminants, bird droppings and any other potential source of paint damage. Finally, when removed, the transit coating must not show any evidence of having changed the appearance of the painted surface. The preparation of emulsified sulfonate products meeting these criteria proved to be a challenge.

During the development of such commercial emulsion products, it was found that at least some existing modified overbased alkaline earth metal sulfonates were not readily emulsifiable by traditional methods of choice, namely addition of an amine/fatty acid at high temperature. A series of experiments suggested the need for significantly high quantities of diluent oil as well as the addition of an oxidized low molecular weight polyethylene in order to facilitate emulsification. The use of a volatile amine/fatty acid was found to be necessary to ensure development of a dry film that is highly resistant to re-emulsification after application to the substrate.

The resulting commercialized product in its most basic form (SACI® 450W, Stoney Creek) and the method of manufacturing same both were attendant with serious disadvantages. These included the heretofore mentioned need for large amounts of diluent oil which resulted in a very fluid and oily film, and perhaps of even greater significance, the need for the use of a volatile organic compound, namely morpholine, as an emulsifier.

Morpholine has been implicated in causing various environmental and health-related problems. Classified as a VOC by environmental regulators, morpholine is prohibited in certain market areas, including Canada and Scandinavian countries. The use of compounds with levels of VOC above certain legislated limits (varying by geographical location) is now illegal. Moreover, emulsified sulfonates containing morpholine have compatibility problems with painted automotive finishes and with certain asphalt emulsions. Based on the serious shortcomings and limitations associated with the use of morpholine as an emulsifier, viable alternatives were vigorously investigated.

A first proposed solution to the above problems was to formulate a morpholine-free sulfonate emulsion by replacing morpholine with a fatty amide. The resulting commercial product proved difficult to manufacture and still required the addition of an amine such as dimethyl amino ethanol (DMAE) for stabilization of viscosity. This free amine also presented a problem from a VOC point of view and, therefore, was not a desirable alternative. Moreover, while this product did meet nearly all of the criteria set forth above for transit coatings, it failed to meet one: no change in appearance. All of the amide products developed did occasionally cause a slight whitening or haze to appear on some types of automotive paints during laboratory test procedures. Extensive laboratory testing led to the conclusion that the inclusion of the amine DMAE or the presence of amine derivative compounds was most likely responsible for the hazing or whitening phenomenon. This problem served as additional incentive to develop an amine free emulsion of anti-corrosive sulfonate based products.

The subject invention has successfully obviated most of the shortcomings and limitations of amine-based sulfonate emulsions. The novel emulsification system described herein provides for the formulation of emulsions of various sulfonates, including structurally modified overbased alkaline earth metal sulfonates (SACI® sulfonates), alone, or in combination with selected additives without the use of amines. Of considerable interest and importance is the fact that said amine-free emulsified sulfonates may be manufactured with only the addition of water and relatively small amounts of a single ingredient to the modified sulfonate base.

SUMMARY OF THE INVENTION

Applicant has discovered that a solution of water and a nonionic, associative thickener (e.g. Acrysol SCT 275, Rohm & Haas) of the type normally used for viscosity and thixotropy modification of latex compounds (typically latex paints) can be used for the amine-free emulsification of sulfonates. Of special interest are calcium sulfonates of the overbased type and specifically, structurally modified, overbased calcium sulfonates (e.g. SACI® 200 and 200A, Stoney Creek). Also of interest and great practical benefit is the ability to produce mixtures of these emulsified products with other ingredients such as neutral diluent oils, linear alcohol/hydrocarbon mixtures (i.e., Epal 20+, Ethyl Corp.), tall oil fatty acids, non-ionic surfactants, oxidized polyethylene waxes, small levels of microcrystalline wax, petrolatums, and/or calcium salts of oxidized petrolatums (i.e., Alox 606, Alox Corporation).

The resulting emulsions may be used for the modification of asphalt emulsions or as bases for the formulation of temporary coatings for the protection of painted automotive surfaces (transit coatings for automobiles). Typically, this involves the addition of a latex, often an SBR type. These compounds may also be employed for the prevention of corrosion of metal surfaces.

Indications are that other types of sulfonates (metal salts such as Magnesium and Barium) may also be emulsified by the same techniques, though the stability and utility of the resulting emulsions has not been fully explored.

Of particular interest is the fact that the process can be accomplished at atmospheric pressure and at temperatures near ambient, typically 150° F. or less. Elevated temperature is primarily used to improve handleability of the highly viscous SACI® or 200A starting materials and the various mixtures thereof.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is, therefore, a primary object of the subject invention to provide amine-free emulsions of various sulfonates, including structurally modified overbased alkaline earth metal sufonates, either alone or in combination with selected additives.

It is another primary object of the subject invention to provide amine-free emulsions of structurally modified overbased alkaline earth metal sulfonates which may effectively be employed as, inter alia, protective metal surface coatings and as bases for automotive transit coatings.

Another object of the subject invention is to provide a method for the production of amine-free emulsions of structurally modified overbased alkaline earth metal sulfonates at atmospheric pressure and near-ambient temperature.

It is also an object of the present invention to provide a method for the production of amine-free emulsions of structurally modified overbased alkaline earth metal sulfonates mixed with other ingredients such as neutral diluent oils, linear alcohol/hydrocarbon mixtures, tall oil fatty acids, oxidized polyethylene waxes, microcrystalline waxes, petrolatums, and/or Calcium salts of oxidized petrolatums.

It is another object of the present invention to create emulsions of non-modified sulfonates which can be used in metal working applications.

Still another object of the present invention is to provide a means of improving compatibility between sulfonate corrosion inhibitors and water borne resins.

Yet another object of the present invention is to create emulsions which provide improved pigment wetting and dispersion in water borne resin systems.

Another object of the present invention is to provide amine free emulsions of non-modified sulfonates for use as corrosion inhibitors in heat transfer media and equipment such as radiators and cooling towers.

These together with other objects of the invention, along with the various features of novelty which characterize the invention, are pointed out with particularity in the claims annexed to and forming a part of this disclosure. For a better understanding of the invention, its advantages and the specific objects attained by its uses, reference should be had to the accompanying detailed description of the preferred embodiments of the invention.

DETAILED DESCRIPTION OF THE PREFERRED EMBODIMENT

The subject invention relates to a method for the emulsification of sulfonates which may be of the alkaline earth metals Calcium, Magnesium, Sodium, or Barium. The sulfonates may be overbased or neutral and, in the case of calcium overbased sulfonates, may be structurally modified to contain crystalline calcium carbonate ("SACI® Corrosion Inhibitors", Stoney Creek). In the case of the SACI® products, additives such as oils, waxes, petrolatums, tall oil fatty acids, calcium salts of oxidized petrolatums, and linear alcohol/hydrocarbon mixtures (byproducts of linear alcohol manufacture) may be added to the solvent free SACI® product(s) prior to emulsification.

The invention also includes the resulting emulsion products which have utility as, inter alia, rust preventative coatings for metals and machinery, and as bases for other temporary (removable) protective coatings when used in combination with various latex resins. These latter coatings may be used on new automobiles during transit.

A series of corrosion inhibitors using water as the primary carrier have been sold by Stoney Creek Technologies, LLC and its predecessors for approximately two decades. All of these products are manufactured in a similar manner.

The first step in this process is the addition of a suitable diluent to the starting sulfonate material which, for example, may be a dispersion of crystalline calcium carbonate/calcium sulfonate complex in mineral spirits (hereinafter "SACI® 700", Stoney Creek). It is known that viscosity of the complex without a diluent is extremely high (essentially solid) and a suitable diluent is required to maintain handleability. The diluent of choice is a petroleum oil. Most often this is a paraffinic oil of a viscosity of 200 centistokes, though other oils are acceptable. Once the diluent is added, the solvent, mineral spirits, are removed by stripping under vacuum and high temperature. The resulting solvent-free product is hereinafter referred to as "SACI®200". The subject method of emulsifying the treated sulfonate complex is then performed.

The invention, in its simplest form, uses an associative thickener in water as the primary emulsifier of the above end-product or other sulfonates. Associative thickeners are used as rheological modifiers for latex paints and are well known in that industry. They are emulsions based on urethane compounds. Examples are "Acrysol SCT 275" from Rohm & Haas and "Rheolate 278" from Rheox. Applicant has discovered that various amounts of associative thickener can be used in accordance with the subject method as emulsifiers. The following Table includes some of the thickeners found to be effective for this purpose.

TABLE 1

Thickeners effective as Emulsifiers

| Name | Manufacturer | Use level (% by wt in water) | Chemical composition |
|---|---|---|---|
| SCT 275 | Rohm & Haas | 3.5–15 | Hydrophobic polyethylene oxide urethane (non-ionic) ethylene glycol monobutyl ether and water as carrier |
| RM 825 | Rohm & Haas | 2.7–6 | Alkali soluble acrylic emulsion, diethylene glycol monobutyl ether and water as carrier |
| RM 1020 | Rohm & Haas | 6.25–18.75 | Urethane associative thickener |
| Polacryl BR 100 | Polacryl | 6 (only level tested) | polyurethane associative thickener, ethylene glycol mono butyl ether and water as carrier |
| Rheolate 278 | Rheox | 6 (only level tested) | Hydrophobic polyethylene oxide urethane (non-ionic) ethylene glycol monobutyl ether and water as carrier |
| Rheolate 255 | Rheox | 6 (only level tested) | Urethane associative thickener, ethylene glycol mono butyl ether and water as carrier |
| Nopco DSX 1550 | Henkel | 6–12 | Polyurethane |
| Nopco DSX 1514 | Henkel | 6 (only level tested) | Polyurethane |

Lesser amounts of some thickeners in the water phase were required suggesting that these thickeners are more effective emulsifiers. Additionally, further experimentation has revealed that mixtures of more than one grade of these thickeners serve as effective emulsifiers.

The associative thickener is added to ordinary tap water (up to 100%) and dispersed by simple mixing with a propeller blade at several hundred RPM. The preferred range approximates 400–1,000 RPM's. Temperature is not critical and experiments have been performed in the range of 65–180° F. Those compositions capable of being processed at ambient temperature are, of course, preferred for economic reasons. Thickeners containing waxes typically require additional heat to achieve melting of the wax. Sufficient time is allowed to thoroughly disperse the thickener, typically around two minutes, until a uniformly clear or slightly cloudy solution is formed. This can be verified by an increase in viscosity of the water as well as by direct observation if a glass container is used.

Emulsions are created by slowly adding the sulfonate or sulfonate-containing mixture to the resulting water/thickener mixture with relatively intense mixing from the same propeller blade. A 50% or less solid content is preferred. Elevated temperature of the oil phase is not necessary but may be used to improve handling properties.

An emulsion is formed immediately as the oil phase is continuously added or added in small increments. The process does not need extreme shear, high temperature or high pressure. It is also noteworthy that the process does not require the addition of diluent oil or an oxidized polyethylene wax in order to emulsify the solvent free grades of structurally modified overbased calcium sulfonates (i.e., SACI®, SACI® 200 and 200A, Stoney Creek) although either or both may optionally be used. All previous methods had indicated the need for the oil and/or the oxidized wax which have proven undesirable when attempting to formulate a film forming product.

To better appreciate the subject method of preparing sulfonate emulsions as well as the properties and characteristics of these novel end-products, specific examples of carrying out the above described method, together with commentary when appropriate, appear below.

The first four examples illustrate work done specifically for the development of a sulfonate emulsion suitable for blending with an emulsified asphalt base which is yet another application of the subject invention. The primary function of the addition of the sulfonate emulsion was the viscosity reduction of the emulsified asphalt. The emulsion from Example 1 was successfully formed and found to be compatible with the emulsified asphalt base. It did not, however, meet the criteria of reduction of viscosity.

EXAMPLE 1

6.24 parts of Acrysol SCT 275 were added to 93.76 parts of tap water and mixed, using an air powered laboratory mixer fitted with a 2 inch propeller blade, using moderate speed. 100 parts of a pre-heated (150° F.) solvent-free, thickened, overbased crystalline carbonate/calcium sulfonate complex (SACI® 200) was added slowly to the water/thickener mixture described above with very high speed (1,000–1,500 RPM), using the same mixer. A homogeneous and stable emulsion with a viscosity of 10,000 cps was formed.

Example 2 details the emulsification of a blend of SACI® 200 and SACI® 214, the latter being a lower viscosity structurally modified overbased Calcium sulfonate made from a mixture of synthetic and natural sulfonates (Witco Canada). Results are similar to the emulsification of SACI® 200 alone, namely that emulsification was successfully accomplished, but with insufficient viscosity reduction of the substrate asphalt emulsion.

EXAMPLE 2

A water/thickener mixture was prepared as in Example 1. 50 parts of SACI® 200 were mixed with 50 parts of SACI® 214, a fluid, overbased, modified calcium sulfonate. This mixture was added, at 150° F., to the water/thickener as in Example 1. A stable, homogenous emulsion was formed with characteristics similar to the emulsion of Example 1, namely a stable emulsion of uniform consistency which casts a film easily.

Example 3 discusses the emulsification of 100% SACI® 214, again with results similar to those obtained for examples 1 and 2. This example also did not result in sufficient viscosity reduction in the emulsified asphalt base.

EXAMPLE 3

100 parts of SACI® 214 were added to the water/thickener mixture from Example 1, using the same technique as described in Example 1. Results were similar to Example 1.

Example 4 relates to the emulsification of a blend of SACI® 200, SACI® 214, a linear alcohol/hydrocarbon mixture (Epal 20+, Ethyl Corp.) and a tall oil fatty acid. These ingredients were chosen to yield an emulsion which would be more effective in depressing viscosity in the asphalt emulsion. The mixture was easily emulsified and the resulting emulsion was compatible and gave the desired viscosity reduction to the asphalt emulsion base.

EXAMPLE 4

100 parts of SACI® 200 were blended with 100 parts of SACI® 214. To this mixture was added 70 parts of molten linear alcohol/hydrocarbon compound (Epal 20+ from Ethyl) and 20 parts of a tall oil fatty acid. These ingredients were thoroughly blended and added to 275 parts of water/thickener mixture from Example 1, at 120° F. using the same technique. Results were similar to those observed in Example 1.

All subsequent experiments were conducted for the purpose of better defining the capabilities and limitations of the invention. In Example 5, a low cost material consisting of a SACI® 200 type product made from reclaimed product and containing small, unspecified, amounts of microcrystalline wax and petrolatum was emulsified by the same technique. Results were similar. This example indicated flexibility in the composition of the base to be emulsified.

EXAMPLE 5

SACI® 200A, Stoney Creek, was prepared from a source of recycled raw materials containing small, but undefined amounts of petrolatum and microcrystalline wax. The resulting product is similar to SACI® 200 and was used in place of SACI® 200 in Example 1. The resulting emulsion was identical and illustrates that other ingredients may be successfully combined with the Calcium sulfonate emulsions.

Examples 6 through 8 illustrate work done to define the flexibility of the invention with respect to the type and level of associative thickener which may be employed. These examples reveal the effects of using a different associative thickener at 3 levels. Differences in resulting emulsion viscosity and appearance are apparent. Higher levels of the particular thickener resulted in a higher viscosity emulsion at equivalent theoretical solids. In other words, once sufficient thickener was added to create the emulsion, addition of more thickener only served to thicken the emulsion and increase its viscosity. Color of the resulting emulsions becomes whiter, probably indicating a change in particle size, as thickener level increases.

EXAMPLE 6

6.24% (by weight) of Acrysol 1020 was added to water (total 300 grams) in a 600 ml beaker and mixed at 80° F. for 2 minutes at 450 RPM. Note that a different associative thickener is used. Following the techniques in Example 1, 100 parts of SACI® 200 were added to the water/thickener and an emulsion was formed with a viscosity of 380 cps.

EXAMPLE 7

12.5 parts of Acrysol 1020 were added to 87.5 parts of water. Following the techniques in Example 1, 100 parts of SACI® 200 were added to the water/thickener and an emulsion was formed with a viscosity of 1700 cps.

EXAMPLE 8

18.74 parts of Acrysol 1020 were added to 81.26 parts of water. Following the techniques in Example 1, 100 parts of SACI® 200 were added to the water/thickener and an emulsion was formed with a viscosity of 3600 cps.

Example 9 deals with the possible use of a modified form of the invention as a transit coating and makes use of the knowledge that an SBR latex (i.e., Genflo 576, GenCorp) can be used to assist in the formation of a dry film which will resist acid rain and other potential paint damaging elements. This example suggests compatibility with an SBR latex resin in some commercial structurally modified sulfonate emulsions. The resulting blended product passes laboratory tests for the effects of simulated acid rain at pH 3.0, 4.0 and sensitivity to tap water and other tests.

EXAMPLE 9

6.24 parts of Acrysol 1020 were added to 93.76 parts of water and mixed as in Example 6. 100 parts of SACI® 200 were added to the water/thickener and an emulsion was formed, again as in Example 6. To this resulting emulsion, 66.6 parts of an SBR latex (GenFlo 576®, GenCorp) was added (25% resin in final blend). The resulting product has a viscosity of 3600 cps.

This product was applied to steel test panels which were painted with an automotive finish and allowed to dry. The coated test panels were evaluated for their ability to meet the requirements of a temporary paint protectant coating (transit coating). These tests include removability with an alkaline cleaner solution and the ability to resist the effects of tap water and simulated acid rain at a pH of 4.0 and 3.0 as well as a metal particle/rust resistance test. The coating satisfied all of the laboratory requirements for a transit coating.

Example 10 explores the ability of the invention to emulsify SACI® 200 containing an ingredient known to improve salt spray in conventional SACI® products.

EXAMPLE 10

This example illustrates the ability to emulsify SACI® 200 blended with a Calcium salt of oxidized petrolatum (Alox 606®, Alox Corp.). Alox 606® is an ingredient known to improve salt spray corrosion resistance in most conventional SACI® products. A blend of 100 parts of SACI® 200 and 5 parts of Alox 606® was prepared by mixing at high temperature.

A water/associative thickener blend was made by adding 4.5 parts of Acrysol SCT 275® and 4.75 parts of Acrysol RM 1020® to 93.75 parts water and mixing as in Example 1. To this water/thickener mixture, 100 parts of the SACI® 200/Alox 606 blend was added as in Example 1.

The resulting emulsion was applied to standard cold rolled steel test panels (Q Panels) and, after appropriate curing in the laboratory, subjected to ASTM B-117 salt spray testing. Panels were inspected at regular intervals and found to provide more than 1500 hours protection (panels were removed from test with no failure evident). One of the test panels was scribed to determine the effect of film damage. No corrosion was observed in the scribed area.

Examples 11–14 represent an effort to explore the adaptability of the invention to sulfonates in general including sulfonates of alkaline earth metals other than Calcium. The utility of such emulsions has not been fully determined, though one may assume that potential uses in the prevention of corrosion are possible.

In Example 11, a standard overbased magnesium sulfonate (M-400 TG, Wico), of the type normally used as an additive to crankcase lubricating oils, was emulsified by the invention.

EXAMPLE 11

A water/thickener mixture is prepared as in example 1 by adding 7.5 parts of Acrysol RM 1020® and 7.5 parts of Acrysol SCT 275® to 142.6 parts of water. To this mixture, 150 parts of overbased Magnesium sulfonate, of the type normally used for engine crankcase oil additives (M400 TG®, Witco) is added as per Example 1. An emulsion forms immediately. Upon standing this emulsion increases in viscosity indicating the need for adjustments to the quantity and/or type of emulsifier.

A steel test panel was coated as in Example 10 and allowed to dry. It was noted that a relatively oil free film was formed. After sufficient drying, the panel was tested in a humidity cabinet (ASTM D 1748-83) for three weeks. Protection was fair to good with a few rust spots.

Example 12 deals with the emulsification of a non-crystalline, overbased synthetic sulfonate (C-300, Witco). The typical uses for this sulfonate are similar to those for M-400.

EXAMPLE 12

A water/thickener mixture was made as in Example 1. Following the same procedure as in Example 1, 100 parts of an overbased calcium sulfonate of the type normally used as a crankcase additive with a 300TBN (C300®, Witco) were added to the water/thickener. A stable emulsion was formed.

Example 13 illustrates the emulsification of an essentially neutral (low TBN), non-crystalline sulfonate (C-45, Witco). Initial results were acceptable, but observation of the resulting emulsion indicates that the level of emulsifier (associative thickener) needs to be adjusted or that the use of a surfactant (auxiliary emulsifier) is indicated.

EXAMPLE 13

A water/thickener mixture was made as in Example 1. Following the same procedure as in Example 1, 100 parts of a neutral calcium sulfonate with high sulfonate content (C45, Witco) were added to the water/thickener. A stable, dark emulsion with viscosity of 6000 cps was formed. Upon observation for 1 week, the emulsion did not change in viscosity but appeared to have marginal stability, indicating the need for an optimized emulsifier.

Example 14 illustrates that the invention, in its simplest form of associative thickener and water only, is adaptable to barium sulfonate (Hybase Barium Petronate® Witco). The resulting emulsion has excellent appearance and stability.

EXAMPLE 14

A water/thickener mixture was made as in Example 1. Following the same procedure as in Example 1, 100 parts of an overbased Barium sulfonate (Hybase Barium Petronate® Witco) was added to the water/thickener mixture. A stable, white emulsion of 3,000 cps viscosity was formed.

Example 15 makes use of an alternate associative thickener Acrysol 825, which for SACI® 200 can be used at a level 50% less than that of Acrysol SCT 275. Again a stable emulsion was formed.

EXAMPLE 15

In this example, the alternate associative thickener Acyrsol 825® was used at reduced level to emulsify SACI® 200. A water/thickener mixture is prepared using 3.125 parts of Acrysol 825® and 96.875 parts of water. Using the same methods as in Example 1, 100 parts of SACI® 200 were added forming a stable emulsion.

Although the present invention has been described with reference to the particular embodiments herein set forth, it is understood that the present disclosure has been made only by way of example and that numerous changes in details of construction may be resorted to without departing from the spirit and scope of the invention. Thus, the scope of the invention should not be limited by the foregoing specifications, but rather only by the scope of the claims appended hereto.

What is claimed is:

1. A method of forming an amine-free emulsion of an alkaline earth metal sulfonate compound, said method comprising the steps of:

a) adding a urethane-based associative thickener to water;

b) dispersing said urethane-based associative thickener in said water by mixing until a uniform solution of said water and said urethane-based associative thickener is formed;

c) adding a oil-based alkaline earth metal sulfonate to said solution of said water and said urethane-based associative thickener; and d) mixing said oil-based alkaline earth metal sulfonate together with said solution of said water and said urethane-based associative thickener until a uniform emulsion is formed.

2. An amine-free emulsion of an alkaline earth metal sulfonate compound prepared in accordance with the method of claim 1.

3. The method of forming an amine-free emulsion of an alkaline earth metal sulfonate compound of claim 1, wherein said urethane-based associative thickener is nonionic.

4. The method of forming an amine-free emulsion of an alkaline earth metal sulfonate compound of claim 1, wherein said oil-based alkaline earth metal sulfonate is selected from the group consisting of Calcium Sulfonate, Magnesium Sulfonate, Sodium Sulfonate and Barium Sulfonate.

5. The method of forming an amine-free emulsion of an alkaline earth metal sulfonate compound of claim 1, wherein said oil-based alkaline earth metal sulfonate is mixed with at least one additive selected from the group consisting of oils, waxes, microcrystalline waxes, petrolatums, tall oil fatty acids, calcium salts of oxidized petrolatums, nonionic surfactants, and mixtures of a linear alcohol and a hydrocarbon.

6. The method of forming an amine-free emulsion of an alkaline earth metal sulfonate compound of claim 1, wherein said oil-based alkaline earth metal sulfonate is mixed with crystalline calcium carbonate.

7. An amine-free emulsion of an alkaline earth metal sulfonate compound prepared in accordance with the method of claim 3.

8. An amine-free emulsion of an alkaline earth metal sulfonate compound prepared in accordance with the method of claim 4.

9. An amine-free emulsion of an alkaline earth metal sulfonate compound prepared in accordance with the method of claim 5.

10. An amine-free emulsion of an alkaline earth metal sulfonate compound prepared in accordance with the method of claim 6.

11. A method of forming an amine-free emulsion of an alkaline earth metal sulfonate compound, said method comprising the steps of:

a) adding a urethane-based associative thickener to water;

b) dispersing said urethane-based associative thickener in said water by mixing until a uniform solution of said water and said urethane-based associative thickener is formed;

c) mixing a oil-based alkaline earth metal sulfonate with at least one additive selected from the group consisting of oils, waxes, microcrystalline waxes, petrolatums, tall oil fatty acids, calcium salts of oxidized petrolatums, nonionic surfactants, and mixtures of a linear alcohol and a hydrocarbon;

d) adding said mixture of said oil-based alkaline earth metal sulfonate and said at least one additive to said solution of said water and said urethane-based associative thickener; and e) mixing said mixture of said oil-based alkaline earth metal sulfonate and said at least one additive with said solution of said water and said urethane-based associative thickener until a uniform emulsion is formed.

12. An amine-free emulsion of an alkaline earth metal sulfonate compound prepared in accordance with the method of claim 11.

13. The method of forming an amine-free emulsion of an alkaline earth metal sulfonate compound of claim 11, wherein said urethane-based associative thickener is nonionic.

14. The method of forming an amine-free emulsion of an alkaline earth metal sulfonate compound of claim 11, wherein said oil-based alkaline earth metal sulfonate is selected from the group consisting of Calcium Sulfonate, Magnesium Sulfonate, Sodium Sulfonate and Barium Sulfonate.

15. The method of forming an amine-free emulsion of an alkaline earth metal sulfonate compound of claim 11, wherein said oil-based alkaline earth metal sulfonate is mixed with at least one additive selected from the group consisting of oils, waxes, microcrystalline waxes, petrolatums, tall oil fatty acids, calcium salts of oxidized petrolatums, nonionic surfactants, and mixtures of a linear alcohol and a hydrocarbon.

16. The method of forming an amine-free emulsion of an alkaline earth metal sulfonate compound of claim 11, wherein said oil-based alkaline earth metal sulfonate is mixed with crystalline calcium carbonate.

17. An amine-free emulsion of an alkaline earth metal sulfonate compound prepared in accordance with the method of claim 13.

18. An amine-free emulsion of an alkaline earth metal sulfonate compound prepared in accordance with the method of claim 14.

19. An amine-free emulsion of an alkaline earth metal sulfonate compound prepared in accordance with the method of claim 15.

20. An amine-free emulsion of an alkaline earth metal sulfonate compound prepared in accordance with the method of claim 16.

* * * * *